(12) United States Patent
Diston et al.

(10) Patent No.: US 6,338,277 B1
(45) Date of Patent: Jan. 15, 2002

(54) FLOWMETER FOR ATTENUATING ACOUSTIC PROPAGATIONS

(75) Inventors: Andrew Stephen Diston, Milton; Christopher James Newton Fryer, Woburn Sands, both of (GB); Andreas Kammerahl, Lemfoerde (DE)

(73) Assignee: G. Kromschroder Aktiengesellschaft, Osnabruck (DE)

( * ) Notice: Subject to any disclaimer, the term of this patent is extended or adjusted under 35 U.S.C. 154(b) by 0 days.

(21) Appl. No.: 09/202,039

(22) PCT Filed: Jun. 6, 1997

(86) PCT No.: PCT/EP97/02943

§ 371 Date: Dec. 4, 1998

§ 102(e) Date: Dec. 4, 1998

(87) PCT Pub. No.: WO97/47950

PCT Pub. Date: Dec. 18, 1997

(51) Int. Cl.[7] ............................................... G01F 1/00
(52) U.S. Cl. ............................ 73/861.28; 73/861.27
(58) Field of Search ........................ 73/861.29, 861.28, 73/861.27, 861.31, 861.25, 861.26, 861.18; 181/212, 224, 238, 240, 247, 248, 252, 256, 257

(56) References Cited

U.S. PATENT DOCUMENTS

| 2,652,127 A | * | 9/1953 | Johnston ..................... 181/247 |
| 3,851,526 A | * | 12/1974 | Drexel ......................... 138/42 |
| 4,108,276 A | * | 8/1978 | Hall et al. ................... 181/256 |
| 4,365,518 A | * | 12/1982 | Zacharias, Jr. ............. 73/861.28 |
| 4,497,202 A | * | 2/1985 | Mermelstein ................. 138/42 |
| 4,523,478 A | * | 6/1985 | Zacharias, Jr. ........... 73/861.28 |
| 4,545,259 A | * | 10/1985 | Jensen et al. ............. 73/861.28 |
| 5,495,872 A | * | 3/1996 | Gallagher et al. ............. 138/44 |
| 5,596,152 A | * | 1/1997 | Berrgervoet et al. .......... 138/44 |
| 5,652,396 A | * | 7/1997 | Gill ......................... 73/861.27 |
| 5,777,237 A | * | 7/1998 | Collier et al. ............ 73/861.27 |

FOREIGN PATENT DOCUMENTS

| EP | 0048791 | 4/1982 |
| FR | 2369566 | 5/1978 |
| WO | 94/09342 | 4/1994 |
| WO | 94/17372 | 8/1994 |
| WO | 94/20821 | 9/1994 |
| WO | 96/06333 | 2/1996 |

* cited by examiner

*Primary Examiner*—Harshad Patel
(74) *Attorney, Agent, or Firm*—Fay, Sharpe, Fagan, Minnich & McKee, LLP

(57) ABSTRACT

A flowmeter for a medium includes two transducers displaced from each other in the direction of flow of the medium. The flowmeter contains an emitting device which emits acoustic signals in both directions through the medium using the transducer. The flowmeter also contains a processing device for determining information via the flow of the medium by monitoring the travel times of the acoustic signals received by the transducers. A part of the space between the transducers defines a flow path which includes a flow structure with at least one medium flow passage extending axially in the direction of the flow of the medium. The medium flow passage has damping devices which are located so that at least one asymmetrical noise propagation mode is damped. The damping device has a damping structure which extends substantially across the whole length of the media flow passage.

28 Claims, 5 Drawing Sheets

FLOWMETER FOR ATTENUATING ACOUSTIC PROPAGATIONS

BACKGROUND OF THE INVENTION

The present invention relates to a fluid flowmeter, more particularly to a fluid flowmeter with a first acoustic transducer located upstream in relation to a second acoustic transducer, where the time of flight of acoustic waves between the transducers is used to measure the flow velocity of a fluid medium which flows between them.

In WO 96/06333, a flowmeter is shown where two concentric pipes form an annular fluid flow passage which allows a medium to enter the inner pipe up to a central element that prevents further flow. The acoustic signals are absorbed by or reflected from the central element.

WO 94/09342, shows a flowmeter that uses plain acoustic waves where the flow path is divided into a plurality of parallel passages which are dimensioned such that the characteristic frequency of the plain wave is higher than the transmission frequency.

WO 94/17372 shows a fluid flowmeter which uses a flow structure located between two transducers. The flow structure is defined by an array of fluid flow passages or an annular fluid flow passage. This fluid flowmeter works most effectively only when plain acoustic waves propagate between the transducers. This can be ensured, in the case of cylindrical fluid flow passages, if the wave length of the sound transmitted is greater than d/0.568 where d is the diameter of the flow passage. The problem which can arise in this situation is that this relatively small diameter can give rise to unwanted effects such as high pressure loss and unwanted acoustic phase shifts at the entry to and the exit from the fluid flow passage. However, if the size of the diameter is increased, higher order modes are excited in the fluid flow passage and these result in errors in the meter. In particular, if a flow structure comprising an annular array or ring of passages is used together with a centrally positioned, coaxial transducer, then asymmetric acoustic modes are produced.

The present invention contemplates a new and improved apparatus and method which overcomes the above mentioned problems.

SUMMARY OF THE INVENTION

In accordance with the present invention, there is provided a flowmeter where the fluid flow passage has at least one attenuation structure positioned so as to attenuate at least one asymmetric acoustic propagation mode. The attenuation structure extends substantially over the length of the fluid flow passage and is positioned on the circumference of the fluid flow passage to correspond with the location of the anti-node of at least one asymmetric acoustic propagation mode.

In accordance with another aspect of the invention, wider flow passages are used to avoid the problems of asymmetric acoustic propagation modes by suitably positioning an attenuation means. This allows the plain wave mode to dominate the other modes and reduces the effects of the other modes on the resultant fluid flow value which is obtained. The attenuation structure runs parallel to the fluid flow passage axis.

In accordance with still another aspect of the invention, an asymmetric propagation mode has an asymmetric distribution around the circumference of the fluid flow passage. This distribution helps to define wave nodes and wave anti-nodes which represent points of a relatively low or high energy of the asymmetric propagation mode, and maximizes the effect of the attenuation structure. Although the attenuation structure has a certain effect on the propagation plane wave, it has a much greater effect on the asymmetric propagation mode by increasing the energy of the plane waves arriving at the receiver relative to the energy from unwanted modes.

Known attenuation structures have a layer of attenuating material provided along the fluid flow passage, but in many cases this will lead to problems of turbulence and the like. Therefore, according to still another aspect of the invention, the attenuation structure comprises an opening facing into the fluid passageway and extending into or through the wall of the fluid flow passage where either one or more openings will be located on one side or a number of openings will be provided on opposite sides of the fluid flow passage corresponding to respective anti-nodes of the asymmetric acoustic propagation mode. These openings are either slots, holes, or a series of holes and the openings either go through the wall or end as blind openings in the wall.

In accordance with yet another aspect of the invention, the attenuation of the at least one asymmetric acoustic propagation mode relative to the plane wave is improved by providing a sound absorbent material within or at a laterally outer end of the opening.

In accordance with a further aspect of the invention, a laterally outer end of the opening, where the walls of the opening could be covered with a material, have a multiplicity of the wall cavities facing toward the opening entrance. These cause the viscose losses in the fluid to be high and highly attenuate the at least one asymmetric acoustic propagation mode. The plane wave is hardly affected by this material. For example, this material may be a gritted material, i.e., sandpaper.

Although the invention has been described in relation to a flow structure having a single fluid flow passage, in accordance with another embodiment of the invention, the flowmeter comprises an array of fluid flow passages, typically an annular array. In this embodiment the passages are arranged symmetrically with respect to the transducers. In one preferred arrangement, each passage has an opening extending along it. Each opening faces into the respective fluid flow passage and is positioned at a radially inward position of the respective fluid flow passage. The opening extends into or through the wall of the fluid flow passage. Each opening may be blind or be in communication with a common, internal passage.

One advantage of this arrangement is the constructional advantage.

A second advantage is an increased attenuation effect of the individual openings where traditionally, the common, internal passage will have an annular shape.

In accordance with a still further aspect of the invention, the meter includes an array, typically an annular array, of fluid flow passages arranged symmetrically with respect to the transducers, wherein each passage has an opening extending along it. Each opening facing into the respective fluid flow passage is positioned at a radially outward position of the respective fluid flow passage and extends into or through the wall of the fluid flow passage. Furthermore, both inner and outer openings could be provided. Typically, each passage in an array of fluid flow passages will have an identical form. A cross-section of each fluid flow passage can be circular, elliptical, rectangular, or hexagonal. Finally, a single, annular fluid flow passage could also be used according to the invention.

It is to be appreciated that although the invention is applicable to the metering of any fluid, including liquids, it is particularly useful for metering gas and it is highly suitable for domestic gas metering.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiment and are not to be construed as limiting the invention. In the drawings.

DETAILED DESCRIPTION OF THE PREFERRED EMBODIMENTS

Figure 1:
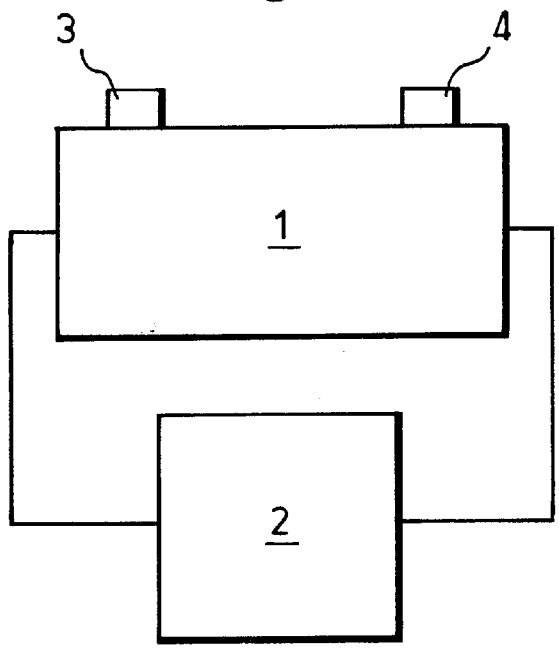
FIG. 1A is a block diagram of the overall system.
Figure 2:
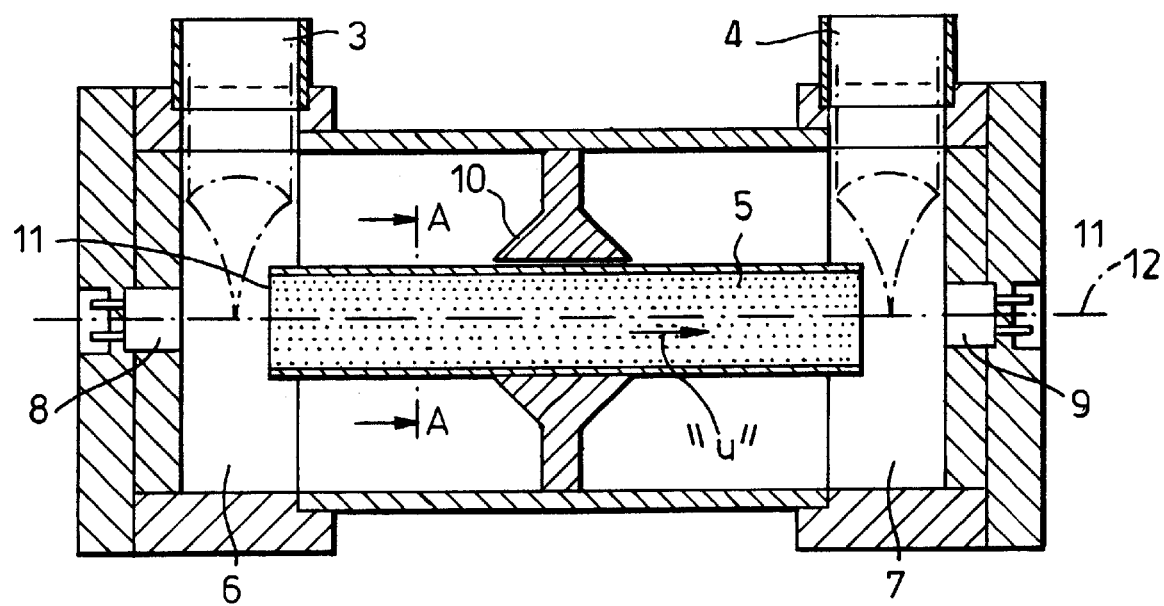
FIG. 2 is a cross-section of the flow sensor apparatus according to the present invention.

With reference to FIGS. 1 and 2, there is shown a flowmeter with a flow sensor 1 and an electronic measurement system 2. The fluid enters the flow sensor 1 at an inlet 3 and exits at an outlet 4 after having traveled down a metering tube structure 5, in flow direction "u", where the metering tube 5 links inlet chamber 6 with an outlet chamber 7.

The flow is probed in the flow sensor 1 using two ultrasonic transducers 8 and 9 which emit and receive pulses of sound down the metering tube 5. The elapsed time $\Delta t$ from transmission to reception is timed in the upstream (+) and downstream (−) directions by the electronics system 2. From these measurements, the volume flow rate through the meter 1 is determined as described, for example, in WO-A-94/17372.

The electronics system 2 includes a signal generator which drives the transducer 8 for an upstream measurement, switching to drive the transducer 9 for a downstream measurement. Acoustic signals propagate through the metering tube structure 5 and are received by the other transducer. Received signals are digitized and fed to a digital signal processing unit from which a flow rate signal is output.

Inlet chamber 6 is a cylindrical cavity which receives a fluid flowing through inlet 3 to produce a fluid flow within the chamber 6 which has no velocity component in the axial direction relative to the metering tube structure 5.

An inner tube holder 10 is shaped to reflect all signals away from the direct path so that echoes reflecting from it do not interfere with the direct path signal until the measurement has been made.

With reference to FIGS. 3A–3I, and continuing reference to FIG. 2, the metering tube section 5 is viewed adjacent an end face 11. Note that the metering tube 5 has an axis of symmetry 12.

Figure 3A:
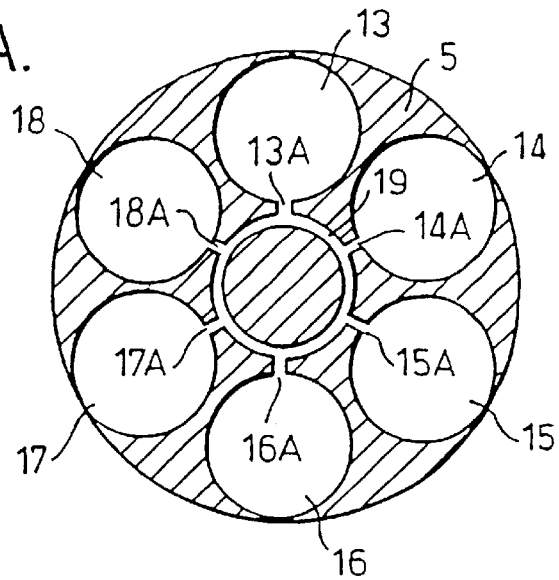
FIGS. 3A to 3I are sections taken on the line A—A in FIG. 2 of nine preferred embodiments of the invention; and, FIGS. 4A and 4B are a side elevation and plan view, respectively, illustrating schematically a part of a further embodiment.

With reference to FIG. 3A, which shows the first embodiment of the invention, a cross-section of the metering structure 5 is shown where the structure 5 is made up of six individual, cylindrical tubes 13–18. Each tube has, on its radially inward side, a respective slot 13A–18A which communicates with a common, annular cavity 19. Each slot runs substantially parallel to the fluid flow passage axis over the entire length of the tube. Each slot 13A–18A is positioned circumferentially at a location at which an anti-node of an asymmetric mode propagating along the tube 13–18 is located. This causes energy from the asymmetric mode to leak through the slots 13A–18A into the common cavity 19. In this way, a significant proportion of the asymmetric mode is attenuated. Any plane waves propagating through the tubes 13–18 has a symmetric energy distribution around the circumference of the tubes and although there will be a small attenuation in the region of the slots, the majority of the plane wave will continue substantially un-attenuated. Thus, the ratio of plane wave energy to asymmetric mode energy is significantly increased. Typical dimensions for the slots 13A–18A in FIG. 3A are for the slot width to be in the range $\lambda/500$ to $\lambda/2$, where $\lambda$ is the wavelength of the propagating acoustic signal. The slot depth may be optimized for different constructions. The radial dimension of the annular cavity is preferably in the range of $\lambda/500$ to $\lambda/10$.

Figure 3B:
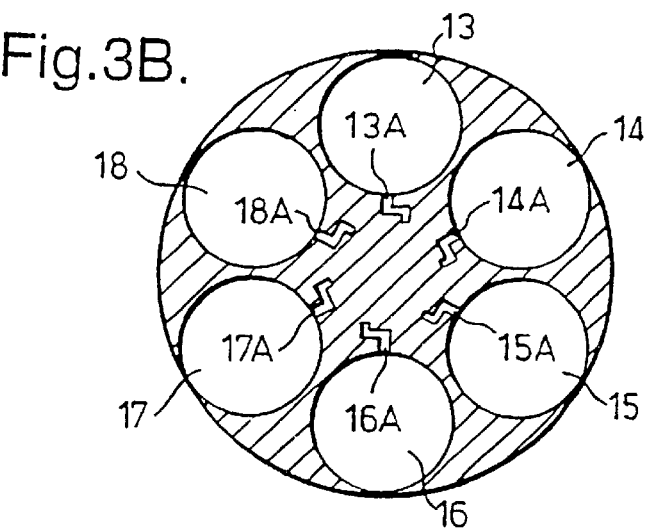

Turning to FIG. 3B, a second embodiment of the present invention is shown, which is a modified form of the embodiment shown in FIG. 3A. In this embodiment, slots 13A–18A are blind and do not communicate with a central, common cavity. These slots are oblong and curved to save space.

Figure 3C:
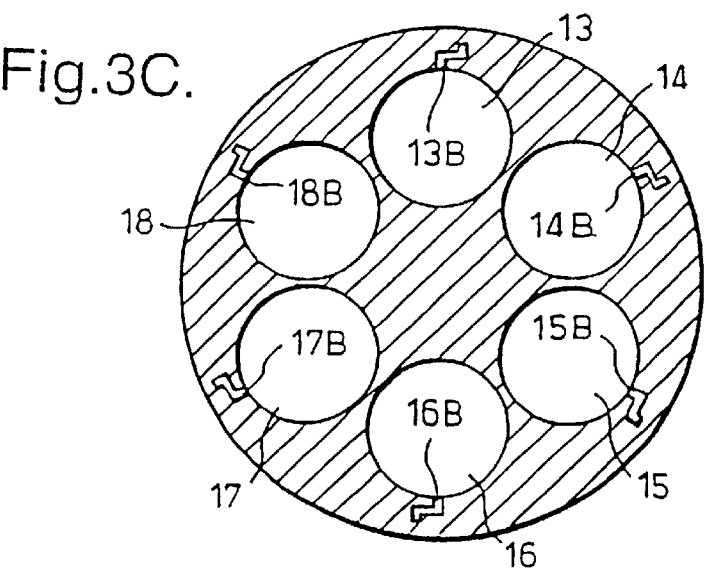

FIG. 3C is an alternative embodiment to FIG. 3B. In this embodiment, radially outer slots 13B–18B are provided instead of radially inner slots 13A–18A.

Figure 3D:
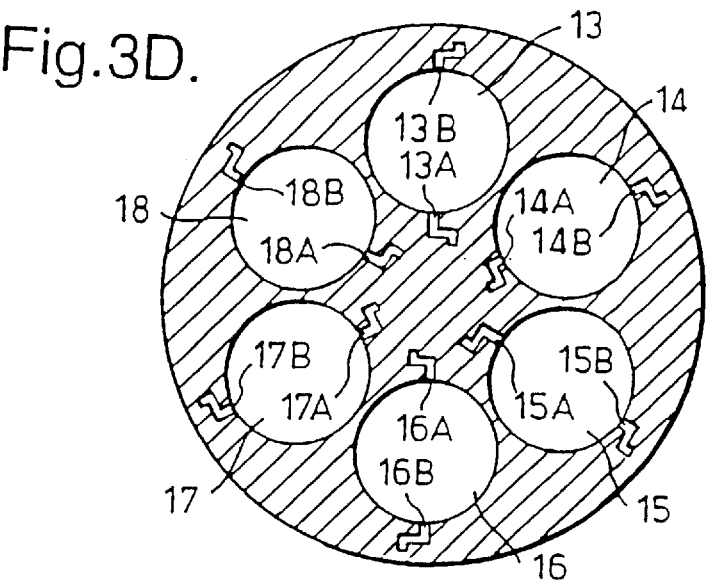

Turning to FIG. 3D, there is shown another embodiment in which each flow passage 13–18 is provided with a pair of diametrically opposed radially inner and radially outer slots 13A–18A; 13B–18B. In this case, the radially inner slots 13A–18A are shown as blind slots, but they could communicate with a common cavity similar to the arrangement as shown in FIG. 3A.

In a preferred embodiment, for maximum efficiency without significantly disturbing the flow of fluid, the slots should be relatively thin, but have a significant depth. Preferably, the slot width will be in the range of $\lambda/500$ to $\lambda/10$. Preferably, the slot depth for blind slots is in the range of $\lambda/2$ to $\lambda/8$. For a transducer frequency of 40 kHz in air, the preferable slot width is 0.1 mm to 0.4 mm, the slot depth for blind slots is preferably from 2.0 mm to 3.0 mm.

In a preferred embodiment, to increase the attenuation of at least one asymmetric mode propagating through the tubes, the radially inner end of the slots 13A–18A, 13B–18B may be covered with a suitable sound absorbing material (not shown). It would also be possible to cover the radially inner ends of the slots 13A–18A, 13B–18B with a material which has a large number of very small cavities which will cause high viscose losses in the fluid, i.e., a gas, and attenuate highly the asymmetric mode.

Figure 3E:
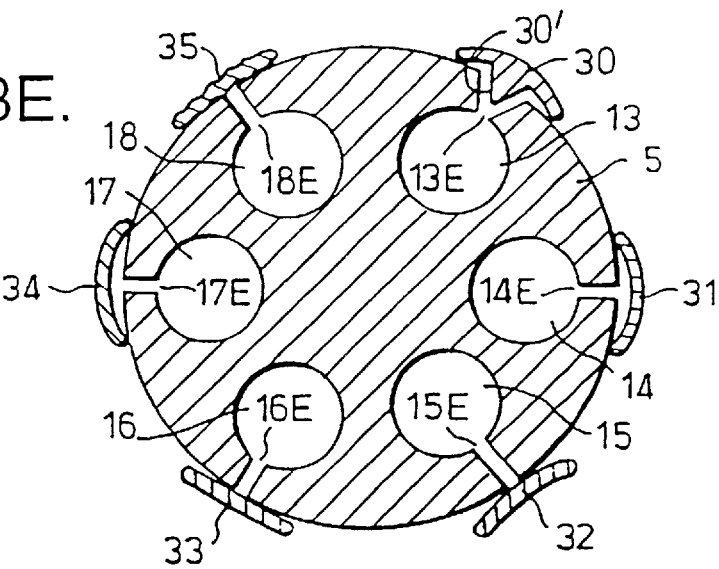

FIG. 3E, shows an embodiment in which each flow passage 13–18 has a radially outer slot 13E–18E extending through the structure 5. In this case, however, the slots 13E–18E do not all have the same in shape or length. Thus, the slot 13E has a V-shaped cross-section while the slots 14E, 15E, and 18E are longer than the slots 16E and 17E. In each case, the radially outer end of the slots 13E–18E is covered by a respective member 30–35 of sound absorbing material, the members having different forms. In particular, the member 30 has a ridge 30' which extends into the slot 13E so as to divide the slot into two subsidiary slots.

Figure 3F:
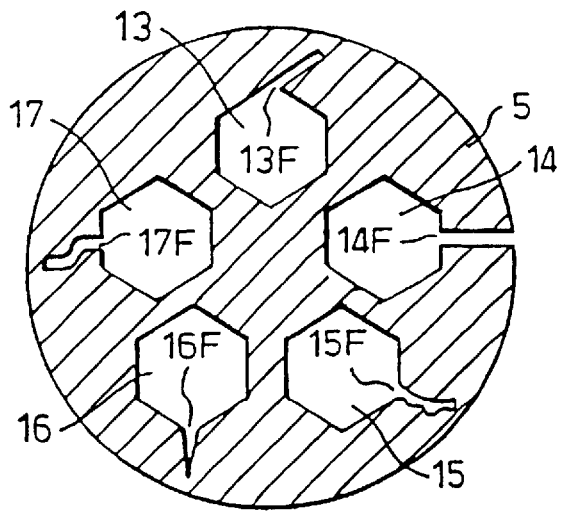

FIG. 3F is a variation of the embodiment shown in FIG. 3C. In this embodiment each flow passage 13–17 has a hexagonal cross section and each slot 13F–17F has a different form. Thus, the slot 13F is a blind cylindrical bore; the slot 14F is a cylindrical bore opening through the wall of the structure 5; the slot 15F has a curved and uneven wall surface; the slot 16F tapers to a point; and the slot 17F has a wavy configuration.

Figure 3G:
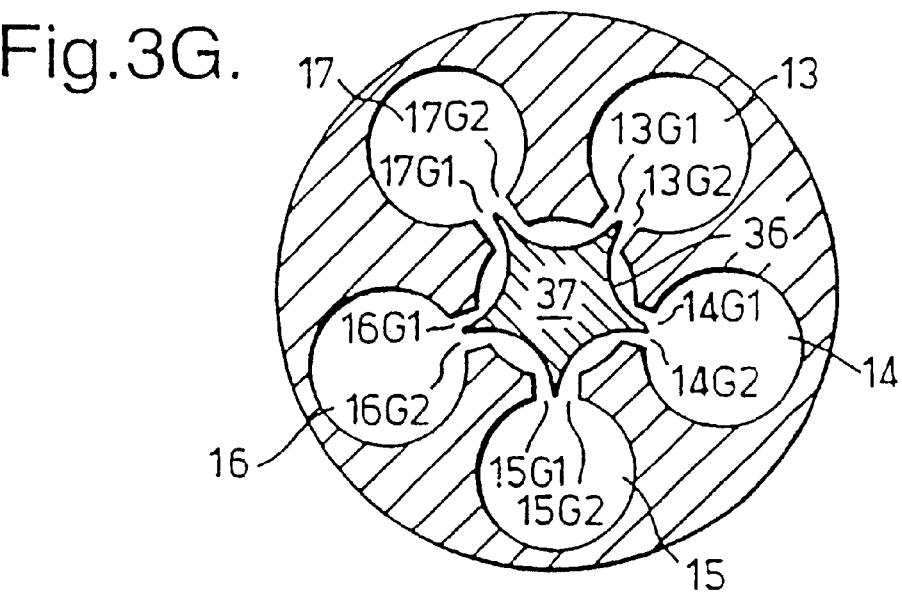

With reference to FIG. 3G, a variation of the embodiment of FIG. 3A is there shown. Each flow passage 13–17 has a relatively wide diameter slot communicating with a central cavity 36 in which a solid member 37 is positioned. The solid member has a star-like cross-section, the arms of the star extending into respective slots. In this way, each slot is subdivided into pairs of slots 13G1, 13G2, etc. lying close to the anti-node location.

Figure 3H:
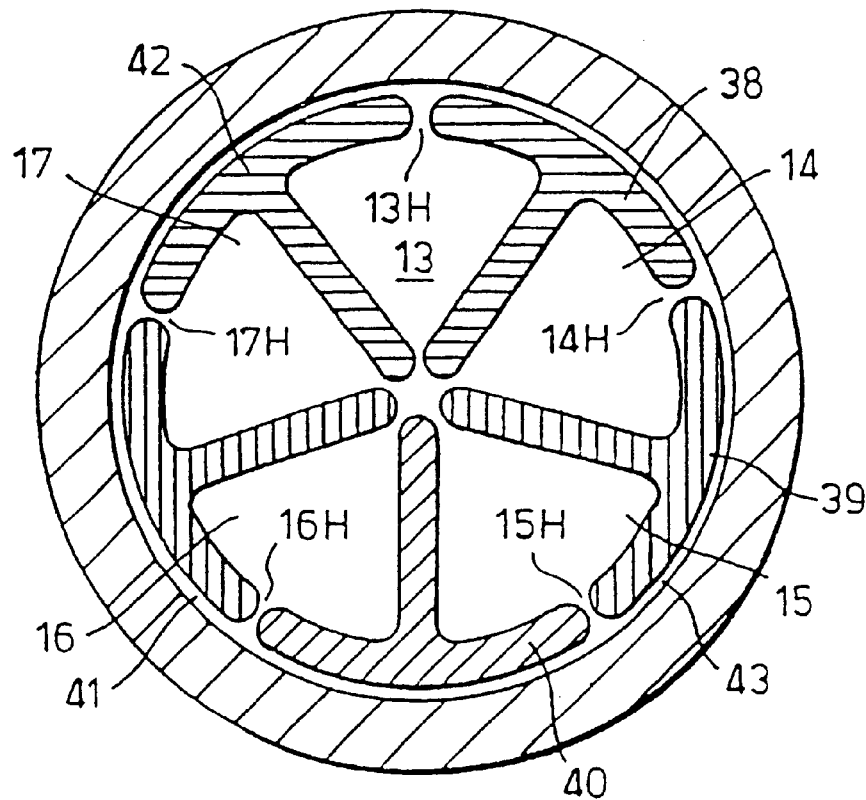

FIG. 3H, shows an embodiment where the flow passages 13–17 are formed by a number of circumferentially spaced members 38–42 each having a generally T-shaped cross-section. Radially outwardly opening slots 13H–17H are formed by the spaces between the members 38–42, where each slot opens into a common, annular outer cavity 43.

Figure 3I:
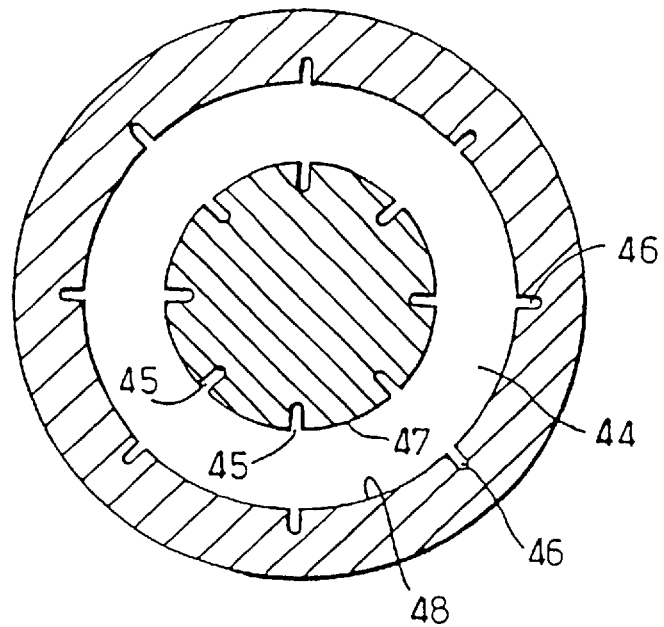

Turning to FIG. 3I, another embodiment is shown where a single, annular flow passage 44 is provided with blind, radially inwardly opening slots 45 and blind, radially outwardly open slots 46 formed in the inner and outer walls 47, 48 respectively.

It is to be appreciated that although various forms of slots have been shown in these examples, any form of opening or series of openings can be used.

Figure 4A:
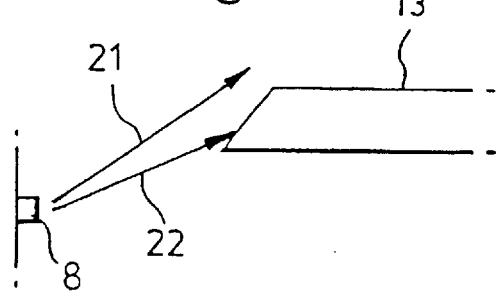
Figure 4B:
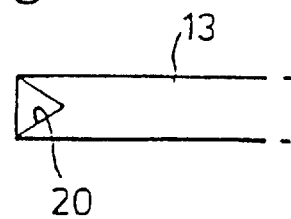

Turning to FIGS. 4A–B, another embodiment is shown where the ends of the tubes 13–18 may be inclined as to have a V-cut 20 (FIG. 4B). In this case, off-axis (asymmetric) energy will generally pass by the end of the tubes 13–18, as shown by an arrow 21, while plane waves will propagate into the tubes 13–18, as shown by the arrow 22.

Further, it will be appreciated that the fluid flow passage axis can be laterally offset to one of the transducers, where the entrance to the fluid flow passage is designed so that a part of the at least one asymmetric propagation mode is not coupled to the fluid flow passage. This creates a very simple form of "attenuation" in that the entrance into the fluid flow passage is designed so that the at least one asymmetric propagation mode is only partly, if at all, coupled to the fluid flow passage. For example, the entrance to the fluid flow passage can be slanted with respect to the fluid flow axis such that the entrance is in a plane inclined in a direction away from the transducer.

The invention has been described with reference to the preferred embodiments. Obviously, modifications and alterations will occur to others upon reading and understanding the preceding detailed description of the preferred embodiments. It is intended that the invention be construed as including all such alterations and modifications in so far as they come within the scope of the appended claims or the equivalents thereof.

What is claimed is:

1. A fluid flowmeter comprising:
   a flow structure having a longitudinal section extending parallel to an axis of fluid flow, said longitudinal section defining at least one fluid flow passage, said passage defined so as to extend axially along said longitudinal section;
   a pair of transducers symmetrically arranged on said axis of fluid flow and spaced to embrace said longitudinal section of said flow structure;
   a transmitter for transmitting acoustic signals of at least one predetermined wavelength λ in a first direction parallel to said axis and in a second direction opposite to said first direction through said fluid by the pair of transducers;
   a processor for determining information relating to the flow of the fluid by monitoring a time of a flight value of the transmitted acoustic signals which are received by the pair of transducers;
   wherein said longitudinal section has a substantially circumferential wall configured to leave a plane wave mode of said acoustic signals substantially unaffected; and
   attenuation means extending substantially along said longitudinal section in communication with said at least one fluid flow passage, said attenuation means positioned to attenuate at least one asymmetric acoustic propagation mode of said acoustic signals.

2. The fluid flowmeter according to claim 1, wherein the attenuation means comprise a structure defining an opening facing into the fluid flow passage and extending at least to the fluid flow passage.

3. The fluid flowmeter according to claim 4, wherein a width of the opening is between about λ/500 and λ/10.

4. The fluid flowmeter according to claim 5, wherein a width of the opening is between about λ/100 and λ/20.

5. The fluid flowmeter according to claim 3, wherein a depth of the opening is between about λ/2 and λ/8.

6. The fluid flowmeter according to claim 4, further comprising a sound absorbent material located adjacent the opening.

7. The fluid flowmeter according to claim 2, further comprising a layer of a material including a multiplicity of small cavities, located at and facing towards an entrance of said opening, said layer being operationally connected to said flow structure.

8. The fluid flowmeter according to claim 2, wherein said flow structure defines a plurality of fluid flow passages positioned symmetrically with respect to the pair of transducers, wherein each fluid flow passage defines an opening extending along each passage, each said opening facing into a respective said fluid flow passage and being positioned at a radially inward position of the respective fluid flow passage, and extending at least to the fluid flow passage.

9. The fluid flowmeter according to claim 8, wherein said flow structure defines a common passage; and
   said openings defined by each fluid flow passage are in communication with said common passage.

10. The fluid flowmeter according to claim 1, wherein the common passage is an internal passage.

11. The fluid flowmeter according to claim 10, wherein the common passage is an outer passage.

12. The fluid flowmeter according to claim 10, wherein the common passage has an annular shape.

13. The fluid flowmeter according to claim 9, wherein the fluid flow passages are positioned in an annular array.

14. The fluid flowmeter according to claim 9, wherein each said fluid flow passage has radially inward and radially outward openings.

15. The fluid flowmeter according to claim 1, wherein the longitudinal section of the flow structure defines an annular fluid flow passage, the passage defined in a position coaxial with respect to the pair of transducers, wherein at least one opening is provided facing into the annular fluid flow passage, wherein the at least one opening is positioned radially inwardly of the annular fluid flow passage.

16. The fluid flowmeter according to claim 1, wherein the longitudinal section of the flow structure defines an annular fluid flow passage, the passage defined in a position coaxial with respect to the pair of transducers, wherein at least one opening is provided facing into the annular fluid flow passage, wherein the at least one opening is positioned radially outwardly of the annular fluid flow passage.

17. The fluid flowmeter according to claim 1, wherein the longitudinal section of the flow structure defines an annular fluid flow passage, the passage defined in a position coaxial with respect to the pair of transducers, wherein at least two openings are provided facing into the annular fluid flow passage, wherein the at least two openings are positioned, respectively, radially inwardly and radially outwardly of the annular fluid flow passage.

18. The fluid flowmeter according to claim 2, wherein the at least one fluid flow passage is cylindrical.

19. The fluid flowmeter according to claim 2, wherein an entrance to the at least one fluid flow passage is slanted with respect to the fluid flow passage axis, such that the entrance is in a plane inclined in a direction away from one of the transducers.

20. The fluid flowmeter according to claim 1, wherein the at least one fluid flow passage is annular and includes an inner wall and an outer wall and wherein said attenuation means comprises:
 a plurality of inwardly opening blind slots which are located circumferentially around the inner wall of the at least one fluid flow passage, and
 a plurality of outwardly opening blind slots which are located circumferentially around the outer wall of the at least one fluid flow passage.

21. A fluid flowmeter comprising:
 a flow structure having a longitudinal section extending parallel to an axis of fluid flow, said longitudinal section defining a plurality of spaced fluid flow passages, said passages defined so as to extend axially along said longitudinal section;
 a pair of transducers symmetrically arranged on said axis of fluid flow and spaced to embrace said longitudinal section of said flow structure;
 a transmitter for transmitting acoustic signals of at least one predetermined wave length λ in a first direction parallel to said axis and in a second direction opposite to said first direction through said fluid by the pair of transducers;
 wherein said longitudinal section has a substantially circumferential wall configured to leave the plane wave mode of said acoustic signals substantially unaffected; and
 a plurality of attenuation means extending substantially along said longitudinal section in communication with said plurality of fluid flow passages, said plurality of attenuation means positioned to attenuate at least one asymmetric acoustic propagation mode of said acoustic signals.

22. The fluid flowmeter of claim 21 wherein said plurality of attenuation means comprise a plurality of slots.

23. The fluid flowmeter according to claim 22, wherein said longitudinal section further defines an annular cavity; and
 the plurality of slots communicate with the annular cavity defined by said longitudinal section.

24. The fluid flowmeter according to claim 23, further comprising a star shaped solid member positioned in the annular cavity and each point of the star shaped solid member extends into one of the plurality of slots.

25. The fluid flowmeter according to claim 23, wherein the plurality of slots are oblong and curved in shape and have blind ends.

26. The fluid flowmeter according to claim 23, wherein the plurality of slots extend radially outwardly of said plurality of fluid flow passages.

27. The fluid flowmeter according to claim 23, wherein the plurality of fluid flow passages are formed by a plurality of circumferentially spaced members with T-shaped cross-sections.

28. A fluid flowmeter comprising:
 a flow structure having a longitudinal section extending parallel to an axis of fluid flow, said longitudinal section defining a plurality of spaced fluid flow passages, said passages defined so as to extend axially along said longitudinal section;
 a pair of transducers symmetrically arranged on said axis of fluid flow and spaced to embrace said longitudinal section of said flow structure;
 a transmitter means for transmitting acoustic signals of at least one predetermined wave length λ in a first direction parallel to said axis and in a second direction opposite to said first direction through said fluid by the pair of transducers;
 wherein said longitudinal section has a substantially circumferential wall configured to leave a plane wave mode of said acoustic signals substantially unaffected; and
 a plurality of attenuation means extending substantially along said longitudinal section in communication with said plurality of fluid flow passages, said plurality of attenuation means positioned to attenuate at least one asymmetric acoustic propagation mode of said acoustic signals, wherein said plurality of attenuation means comprise a plurality of slots, wherein said longitudinal section defines an annular cavity, wherein said plurality of slots communicate with the annular cavity and said plurality of slots extends radially outwardly of said plurality of fluid flow passages.

* * * * *